US011531613B1

(12) United States Patent
Lomnitz et al.

(10) Patent No.: US 11,531,613 B1
(45) Date of Patent: Dec. 20, 2022

(54) SYSTEMS FOR REMOTE DETERMINATION OF DATA FROM TEST DEVICES

(71) Applicant: HEADSPIN, INC., Palo Alto, CA (US)

(72) Inventors: Jason Lomnitz, Woodland, CA (US); Brian Perea, Menlo Park, CA (US); Brien Colwell, Redwood City, CA (US); Daweon Ryu, Menlo Park, CA (US); Stepan Salenikovich, Montreal (CA)

(73) Assignee: HEADSPIN, INC., Palo Alto, CA (US)

( * ) Notice: Subject to any disclaimer, the term of this patent is extended or adjusted under 35 U.S.C. 154(b) by 0 days.

(21) Appl. No.: 17/206,926

(22) Filed: Mar. 19, 2021

(51) Int. Cl.
*G06F 9/44* (2018.01)
*G06F 11/36* (2006.01)

(52) U.S. Cl.
CPC ...... *G06F 11/3612* (2013.01); *G06F 11/3688* (2013.01)

(58) Field of Classification Search
CPC .................. G06F 11/3612; G06F 11/3688
See application file for complete search history.

(56) References Cited

U.S. PATENT DOCUMENTS

| | | | | |
|---|---|---|---|---|
| 6,980,131 B1* | 12/2005 | Taylor | ...................... | G08G 1/20 340/988 |
| 7,165,190 B1 | 1/2007 | Srivastava et al. | | |
| 8,516,308 B1* | 8/2013 | Gill | ...................... | G06F 11/079 717/176 |
| 9,348,727 B1* | 5/2016 | Cai | ...................... | G06F 3/04842 |
| 9,374,423 B2* | 6/2016 | Crosbie | ................. | B60W 50/14 |
| 9,693,050 B1* | 6/2017 | Madhani | ............... | G06F 1/1686 |
| 2004/0064552 A1* | 4/2004 | Chong | ................ | G06F 11/3006 709/224 |
| 2009/0061845 A1* | 3/2009 | King | ..................... | H04W 24/06 455/423 |
| 2011/0246834 A1* | 10/2011 | Rajashekara | ....... | G06F 11/3676 714/E11.208 |
| 2017/0093995 A1 | 3/2017 | Nitsan et al. | | |
| 2017/0168914 A1 | 6/2017 | Altman et al. | | |
| 2019/0095304 A1 | 3/2019 | Kumarasamy et al. | | |

OTHER PUBLICATIONS

Alonso Nogueiro, L., "Patent Cooperation Treaty International Search Report and Written Opinion dated May 12, 2022", Patent Cooperation Treaty Application No. PCT/US22/70363, Patent Cooperation Treaty, dated May 12, 2022.

\* cited by examiner

*Primary Examiner* — Hang Pan
(74) *Attorney, Agent, or Firm* — Lindauer Law, PLLC

(57) ABSTRACT

Devices at different geolocations are configured to determine and share information regarding execution of an application under various conditions. Data determined by a user device includes private information, such as screen capture data, location data, or information about the user. The user device processes the data locally, such as by determining performance metrics or other characteristics of execution of the application, and sends this information to a server. The data sent to the server excludes the private information. The server determines additional data associated with execution of the application by devices other than the user device, which may include screen capture data or location data associated with those other devices. The additional data is used in conjunction with the data received from the user device to generate interfaces indicative of performance metrics of the application.

20 Claims, 5 Drawing Sheets

SYSTEMS FOR REMOTE DETERMINATION OF DATA FROM TEST DEVICES

BACKGROUND

Applications may function differently at different locations, on different devices, and under different network conditions. For example, these factors may affect the quality or other characteristics of video or audio output, use of computational resources by a device, and so forth. Acquiring information regarding performance of devices executing an application may be useful for identifying issues that may be addressed to improve performance of the application. However, limited availability of devices at different locations that are able to execute an application may constrain the ability to acquire this information.

INCORPORATION BY REFERENCE

U.S. patent application Ser. No. 14/850,798, filed Sep. 10, 2015 and titled "System for Application Test", now U.S. Pat. No. 9,681,318, is hereby incorporated by reference in its entirety.

U.S. patent application Ser. No. 15/425,757, filed Feb. 6, 2017 and titled "Mobile Device Point of Presence Infrastructure", now U.S. Pat. No. 10,729,038, is hereby incorporated by reference in its entirety.

U.S. patent application Ser. No. 15/425,652, filed Feb. 6, 2017 and titled "System for Management of an Array of Proxy Access Devices", now U.S. Pat. No. 10,855,789 is hereby incorporated by reference in its entirety.

U.S. patent application Ser. No. 15/783,859, filed Oct. 13, 2017 and titled "System for Testing Using Remote Connectivity" is hereby incorporated by reference in its entirety.

U.S. patent application Ser. No. 16/694,886, filed Nov. 25, 2019 and titled "System for Identifying Issues During Testing of Applications" is hereby incorporated by reference in its entirety.

U.S. patent application Ser. No. 17/006,596, filed Aug. 28, 2020 and titled "Reference-Free System for Determining Quality of Video Data" is hereby incorporated by reference in its entirety.

U.S. patent application Ser. No. 17/179,136, filed Feb. 18, 2021, and titled "Systems for Remote Communication with Test Devices" is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
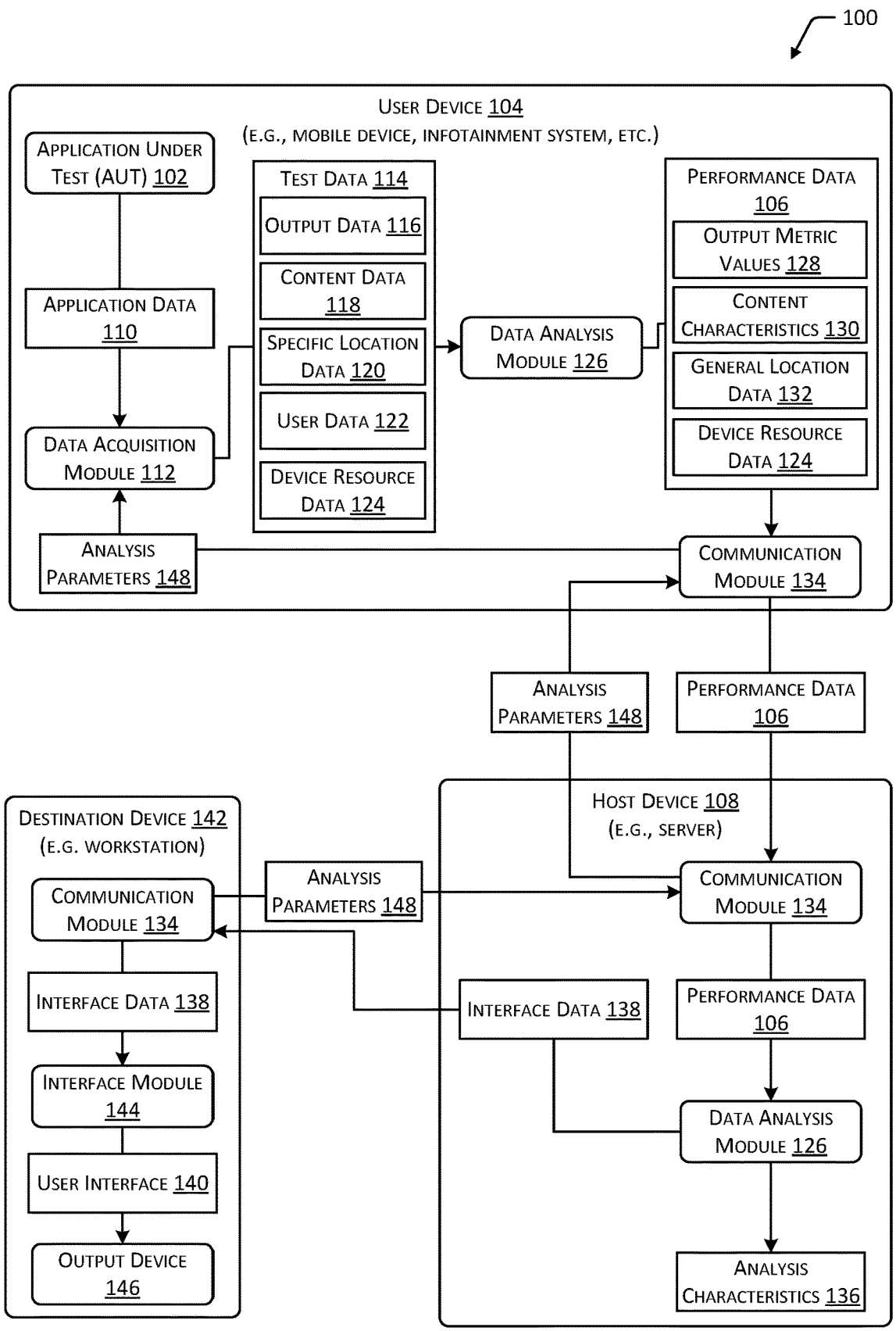
FIG. 1 is a diagram depicting an implementation of a system for analyzing data associated with an application under test (AUT) executed by a user device and sending performance data indicative of the analysis to a host device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may provide various functions, some of which may be associated with execution of one or more applications. Computing devices may include, for example, smartphones, laptops, tablet computers, desktop computers, servers, embedded devices, wearable computing devices, appliances, computing devices associated with vehicles (e.g., infotainment systems, vehicle management systems, and so forth), set top box devices, smart televisions, network-enabled speakers, and so forth. Functions provided by computing devices may include, without limitation, retrieval or transmission of data, presentation of data using a display device, acquisition of data using a camera, output of audio, acquisition of audio data using a microphone, processing of data, and so forth. For example, a smartphone executing an application may present a video using a display, and may output audio associated with the video using a speaker. As another example, an infotainment system associated with a vehicle may acquire data associated with the operation, function, performance, or status of the vehicle and may store, transmit, or present at least a portion of this data.

The performance of an application executed by a computing device ("device") may be evaluated based on various characteristics. Such characteristics may include a quality associated with a video or audio output, an amount of content that is presented, an amount of data that is transferred, use of computational resources such as memory or processor use, and so forth. In some cases, these characteristics may be affected by the location of the device executing the application, characteristics of the device itself, characteristics of one or more networks used to exchange data, and so forth. Additionally, in some cases, these characteristics may represent unacceptable performance of the application under certain conditions. For example, certain types of devices, devices accessing certain networks, or devices attempting to perform certain functions associated with an application may demonstrate suboptimal performance indicative of one or more issues. A developer of an application may seek to test the application by executing the application under certain conditions to determine characteristics of an output or of the device executing the application that may indicate acceptable or unacceptable performance of the application. This testing process may enable the developer to discover issues that may occur during use of the application, which the developer may then address to attempt to improve performance of the application. However, configuring multiple types of devices at multiple locations around the world to execute an application, determine data regarding execution of the application, and provide this data to other devices may be a very time and resource-intensive task. The limited availability of devices, locations, network conditions, and so forth that may be tested may hinder the ability to test and improve applications under a wide variety of conditions.

Described in this disclosure are systems and methods for configuring an edge device (e.g., a user device), such as a smartphone, a vehicle-based system (e.g., infotainment system, monitoring system, communication system, etc.), or other type of computing device associated with a user, to determine test data during execution and use of an application. For example, computer-executable instructions for acquiring data regarding characteristics of the application, characteristics of the user device executing the application, characteristics of networks accessed by the user device, or characteristics of other computing devices accessed by the user device may be included within an application, such as a software development kit (SDK). In other implementations, an SDK or other type of computer-executable instructions may function as a system application or within the operating system of the user device. The SDK or other type of instructions may cause the user device to store test data, such as in a buffer or other data storage medium, as a user interacts with the user device to perform functions associated with the application. The test data may include data indicative of output presented by the user device, such as screen capture data indicative of display output, audio capture data indicative of audio outputs, and so forth. The test data may also include data indicative of input received by the user device, such as voice input or other data acquired using a microphone, input acquired using a camera, input acquired using a keyboard, touchscreen or other input device, and so forth. The test data may additionally include data indicative of components of the user device that are used, such as a display, speaker, microphone, camera, wireless communication interface, and so forth. The test data may also include data indicative of quantities of data sent or received by the user device, types of data sent or received, and so forth. In some cases, test data may include data indicative of a location of the user device, such as a location determined using a global positioning system (GPS) receiver or other type of location sensor, a location determined using one or more network addresses, or so forth. Additionally, in some cases, test data may include information regarding a user of the user device, such as information associated with a user account.

The user device may be configured to process the test data locally (e.g., on the user device) to determine performance data indicative of one or more performance metrics associated with the execution of the application. Processing of the test data on the user device may use the same processors and other components as those used to execute the application, or in some implementations, may use different components of the user device. While the test data may include private information associated with one or more users, such as screen capture data, location data, user data, and so forth, the performance data may include performance metrics determined based on the test data, and may exclude private information. For example, the performance data determined by the user device may include an indication of video quality, frame rate, or other video characteristics that may indicate acceptable or unacceptable performance of the application, but may not include screen capture data or data indicative of the type of content that was presented. As another example, the performance data may include an indication of a quantity of data that was sent or received by the user device, and in some cases types or categories of the data, but not information indicative of the nature of the data that was sent or received. As yet another example, performance data may include a general location associated with the user device, such as a city or other geolocation, but may not include a specific location, such as a street address. For example, a precise location, represented as navigational coordinates determined using a location system, may be truncated or varied to form a general location and prevent disclosure of the precise location of a user device. Performance data may also include computational resources used by the user device, such as values indicative of processor or memory utilization. The performance data may be sent to one or more servers or other computing devices, which in some implementations may provide access to the performance data to other devices or generate interface data for presentation of an interface that indicates performance metrics associated with operation of the application or the user device.

Processing of the test data to determine performance data using the user device prevents the transmission of private information, such as screen capture data, audio capture data, other captured input or output data, location data, an identification of content that was presented, user data, and so forth, to other devices. Therefore, various types of edge devices (e.g., user devices, such as smartphones or other portable devices, or vehicle-based systems such as infotainment systems) at different locations around the world may be accessed, and performance data acquired therefrom, without compromising the privacy of the users associated with the devices. As a result, user devices may be used to test applications and identify potential issues associated with the applications, reducing the need to install and maintain devices at a large number of locations for the specific purpose of testing applications. In some implementations one or more machine learning algorithms may be used to determine issues associated with performance of an application or user device, based on data determined from multiple computing devices. For example, data from a user device may be classified using annotated sets of data representing use of the application by other computing devices to determine particular issues associated with execution of the application by the user device, values representative of quality or other performance metrics associated with the user device, and so forth.

In some implementations, a server receiving the performance data may receive test data from one or more additional devices associated with the application. In some cases, one or more of these additional devices may have characteristics identical or similar to characteristics of the user device. Use of data from these additional device(s) and from the user device may enable more comprehensive information to be provided to a developer or other individual associated with the application. For example, an interface generated using the performance data may lack content indicative of screen capture data, location data, or other information associated with users. However, based on characteristics of the application or user device, which may be determined from the performance data, the server may determine additional test data from one or more additional computing devices, such as devices in communication with the server that are used for the purpose of testing applications. In some implementations, the additional test data may be determined from additional computing devices by causing the computing device(s) to execute the application. In other implementations, existing data associated with previous use of the application by the device(s) may be accessed. Interface data may be generated based on performance data from the user device as well as test data or performance data from the additional computing device(s). As a result, an interface may present performance metrics associated with execution of an application by a user device but may exclude screen capture data and other private information associated with the user device while presenting screen capture data, location data, and so forth associated with other computing devices.

In response to a request from a user, such as a developer associated with an application, the server may cause one or more user devices, or other devices associated with the server, to determine data associated with execution and use of the application. For example, a developer may specify one or more of particular conditions, device types, networks, or other characteristics of the application, a computing device, or a network. The developer may also specify particular types of data that are to be determined by a device that executes the application. For example, the specified conditions and types of data may be provided to one or more servers, which may determine user devices or other associated devices that correspond to the condition(s). The server(s) may provide data indicative of the specified types of data to the user device(s). Devices that correspond to the conditions specified by the developer may acquire data associated with the application during use of the application, while devices that do not correspond to the specified conditions may not acquire such data. For example, an SDK executing as part of an application on a user device may refrain from determining test data or performance data associated with an application if the conditions associated with the user device do not correspond to those specified by the developer, enabling a developer to prevent an SDK from performing particular functions without requiring the application or the SDK to be modified. In a similar manner, particular functions of the SDK that are performed under certain conditions may be specified. For example, an SDK may acquire a first type of data under a first set of conditions, a second type of data under a second set of conditions, and may refrain from acquiring or analyzing data associated with an application if the first or second set of conditions are not met.

As one example, a developer may specify a power status of a device, such as a quantity of power associated with a battery, or whether the power source of a device is currently charging. Continuing the example, an SDK associated with a device may be configured to acquire data regarding an application only if the charge state of the battery of the device exceeds a selected value. As another example, a developer may specify that data is to be determined by a particular type of device. Continuing the example, a developer may seek to acquire data associated with execution of the application by a type of device for which data has not been previously acquired, while an SDK associated with another type of device may not acquire data regarding the application. As another example, a developer may specify a particular version or build associated with the application, and only devices that store the particular version or build may acquire or analyze test data or performance data. As yet another example, a developer may specify particular networks, network types, or network conditions, and only devices that communicate using the specified networks may acquire or analyze test data or performance data.

Enabling a developer to specify particular parameters that cause one or more devices to perform certain functions may enable targeted acquisition of information, such as information associated with only particular versions of an application or information obtained using only certain types of computing devices. As a result, time, cost, and computational resources associated with acquisition of other information may be avoided. Additionally, use of parameters to control the particular devices from which data is acquired may prevent use of devices with constrained resources or impact to users of the devices. For example, a developer may input parameters that prevent devices having processor or memory use that is greater than a threshold, or a charge state of a battery that is less than a threshold, from expending computational resources to acquire test data at a time when the resources of the device are constrained.

FIG. 1 is a diagram 100 depicting an implementation of a system for analyzing data associated with an application under test (AUT) 102 executed by a user device 104 and sending performance data 106 indicative of the analysis to a host device 108. The user device 104 may include any type of computing device including, without limitation, a smartphone, a portable computing device, a vehicle computing device (such as an infotainment system, vehicle monitoring system, vehicle communication system, fleet management or vehicle control system, and so forth), a wearable computing device, a personal computer, one or more servers, and so forth. For example, the user device 104 may include a smartphone carried by a user or an infotainment system associated with a vehicle driven by the user. The user device 104 may store and execute the AUT 102. For example, a user in possession of the user device 104 may execute the AUT 102 and cause the user device 104 to perform one or more functions associated with the AUT 102. The functions associated with the AUT 102 may include one or more of receipt or transmission of data; output of video data, audio data, or other types of output; acquisition of input using a camera, microphone, or other input device; processing of data, and so forth. Execution of the AUT 102 may cause generation of application data 110. Application data 110 may include input data representing inputs received by the user device 104 or outputs presented by the user device 104 that are associated with the AUT 102, data associated with the AUT 102 that is received, transmitted, or processed, and so forth.

A data acquisition module 112 associated with the user device 104 may determine test data 114 based on the application data 110. The data acquisition module 112 may include an SDK or other type of code included within the AUT 102 or within one or more system modules, such as an operating system module, associated with the user device 104. For example, the data acquisition module 112 may include one or more logging modules, telemetry modules, data processing modules, and so forth, that may store one or more portions of the application data 110, modify one or more portions of the application data 110, generate additional data based on one or more portions of the application data 110, and so forth.

In some implementations, the test data 114 may include output data 116 indicative of one or more outputs presented by the user device 104 that are associated with the AUT 102. For example, the output data 116 may include screen capture data indicative of video or image output presented by the user device 104, such as a data stream indicative of data presented using a display, audio capture data indicative of audio output, and so forth. In some cases, the test data 114 may include input data indicative of data received by the user device 104 using a microphone, camera, or other input device. The test data 114 may also include content data 118 indicative of the content that is presented using the user device 104. For example, content data 118 may include identifiers indicative of particular content, particular types or categories of content, quantities of content that are presented, and so forth. In some implementations, the test data 114 may include specific location data 120, such as data determined from a GPS receiver or other type of location sensor that indicates a coordinate location or other specific location of the user device 104 during execution of the AUT 102. The test data 114 may also include user data 122 indicative of characteristics of a user or user account associated with the AUT 102 or user device 104. For example, user data 122 may include identifying information associated with a user, location information such as an address, historical behavior indicative of use of the AUT 102 or user device 104 by the user, and so forth. The test data 114 may additionally include device resource data 124. Device resource data 124 may indicate use of computational resources by the user device 104, such as processor or memory utilization. Device resource data 124 may indicate use of components of the user device 104, such as displays, speakers, cameras, microphones, wireless communication interfaces, and so forth. Device resource data 124 may indicate quantities of data sent, received, or processed by the user device 104. In some cases, device resource data 124 may include data indicative of characteristics of communication using one or more networks, such as latency, data throughput, a path of computing devices or networks through which data is sent or received, and so forth.

In some cases, the test data 114 may include private data associated with a user of the user device 104. For example, the output data 116 may include screen capture data or audio capture data indicative of content presented to the user. As another example, test data 114 may include input data acquired using a camera, microphone, or other input device. As other examples, test data 114 may include a specific location of the user device 104, information associated with the user that is included within the user data 122, specific content that was accessed by the user, and so forth. Transmission of the test data 114 to other computing devices may compromise the privacy of one or more users associated with the user device 104. Therefore, the user device 104 may be configured to process the test data 114 to determine performance data 106. Performance data 106 may indicate one or more performance metrics associated with the AUT 102 or user device 104, characteristics of execution of the AUT 102 by the user device 104, and so forth, while excluding screen capture data, specific location data 120, or other information associated with one or more users.

Specifically, FIG. 1 depicts a data analysis module 126 associated with the user device 104, which may determine performance data 106 based at least in part on the test data 114. The performance data 106 may include data indicative of performance of the AUT 102 or user device 104 while excluding private information associated with one or more users, such as screen capture data, specific location data 120, and so forth. For example, the performance data 106 may include output metric values 128 indicative of characteristics of output presented by the user device 104 during execution of the AUT 102. Continuing the example, output metric values 128 may include characteristics of video output while excluding screen capture data or other indications of the video content that was presented, such as a frame rate, the presence or absence of blurriness, the amount of a display area utilized by an output, the presence or absence of particular threshold display outputs, such as blank screens, images or animations indicative of loading or buffering of content, identical frames of video data indicative of slow or frozen video output, and so forth. In some implementations, the output metric values 128 may include one or more values indicative of a quality of a display output, as described in U.S. patent application Ser. No. 17/006,596, incorporated by reference previously. In a similar manner, output metric values 128 may include characteristics of audio output that may indicate the quality of the output or the performance of the AUT 102 or user device 104, while excluding audio capture data.

The performance data 106 may also include an indication of content characteristics 130 of at least a portion of the content associated with the AUT 102. Content characteristics 130 may include an indication of the type or quantity of content that is presented, such as a quantity of video data or audio data that is presented, a quantity of a display area that is utilized, a volume of audio that is output, and so forth. The content characteristics 130 may exclude an indication of the particular content that was presented.

The performance data 106 may include general location data 132, which may indicate a general location associated with the user device 104 during execution of the AUT 102, rather than a specific location. For example, the general location data 132 may indicate a particular geolocation, such as a country, state, province, or city associated with the user device 104, one or more networks accessed by the user device 104, and so forth. The general location data 132 may exclude the specific location data 120. For example, the general location data 132 may exclude location data determined using a GPS receiver or other location sensor, specific addresses or coordinate locations associated with the user device 104, and so forth.

In some cases, the performance data 106 may exclude categories of information included within the test data 114. For example, FIG. 1 depicts the performance data 106 excluding the user data 122. In other cases, the performance data 106 may include categories of information included within the test data 104 that do not include private information. For example, the performance data 106 is shown including the device resource data 124.

A communication module 134 associated with the user device 104 may send at least a portion of the performance data 106 to the host device 108. In some implementations, the communication module 134 may access a wireless communication interface or other type of communication component(s) associated with the user device 104. The host device 108 may include, without limitation, any of the types of computing devices described with regard to the user device 104. For example, the host device 108 may include one or more servers in communication with the user device 104 via one or more wireless networks. A communication module 134 associated with the host device 108 may receive the performance data 106 from the user device 104. While FIG. 1 depicts a single user device 104, a host device 108 may receive data from any number of user devices 104. Additionally, while FIG. 1 depicts a single host device 108, any number of host devices 108 may be used. For example, the host device(s) 108 may include multiple servers in networked communication.

A data analysis module 126 associated with the host device may determine analysis characteristics 136 and interface data 138 based on the performance data 106. Analysis characteristics 136 may include one or more characteristics of the AUT 102, user device 104, networks accessed by the user device 104, other computing devices accessed by the user device 104, or of the performance data 106 itself that may be used to determine similar computing devices that may be caused to execute the AUT 102 to determine additional test data 114. Use of the analysis characteristics 136 to determine additional test data 114 associated with additional computing devices for use is described with regard to FIG. 2.

The interface data 138 may be used by the host device 108 or one or more other computing devices to cause presentation of a user interface 140 that represents at least a portion of the performance data 106. For example, a destination device 142 may provide a request indicative of the AUT 102, the user device 104, or one or more characteristics of the AUT 102 or user device 104 to the host device 108. The host device 108 may determine correspondence between the request and one or more of the performance data 106 or the interface data 138. In response to the request, the host device 108 may send at least a portion of the interface data 138 to the destination device 142. In other implementations, the host device 108 may send at least a portion of the performance data 106 to the destination device 142, and the destination device 142 may determine interface data 138 based on the performance data 106.

The destination device 142 may include, without limitation, any of the types of computing devices described with regard to the user device 104 or host device 108. For example, the destination device 142 may include a workstation or personal computer associated with a developer of the AUT 102. Continuing the example, based on the performance data 106 or the interface data 138, a developer may identify issues associated with execution of the AUT 102 by the user device 104 and modify the AUT 102 to improve performance of the AUT 102 or of devices that execute the AUT 102. An interface module 144 associated with the destination device 142 may generate a user interface 140 based on the interface data 138, which may be presented using one or more output devices 146. Example user interfaces are described, without limitation, in U.S. patent application Ser. Nos. 14/850,798; 15/425,757; 15/425,652; 15/783,859; and Ser. No. 16/694,886, incorporated by reference previously.

In some implementations, the destination device 142, or another computing device, may provide analysis parameters 148 to the host device 108. The analysis parameters 148 may be indicative of one or more of: a characteristic of a computing device, a characteristic of an application, a characteristic of a network associated with a computing device, or other conditions that may cause a computing device, such as the user device 104, to determine test data 114 and performance data 106. A device characteristic may include one or more of hardware, software, firmware, geolocation, device type, and so forth associated with a computing device. For example, the analysis parameters 148 may specify a particular type of computing device, a particular operating system associated with the computing device, a particular type of wireless radio associated with the device, and so forth. In one implementation, the analysis parameters 148 may specify a charge state of a battery or other power source. For example, a computing device may not be prevented from determining test data 114 or performance data 106 if the charge state of the battery is less than a selected value. In some cases, a computing device may begin determining test data 114 or performance data 106 but may cease determining such data if the charge state of the power source falls below the selected value. An application characteristic may include a build or version of the AUT 102, information indicative of software dependencies associated with the AUT 102, and so forth. For example, the analysis parameters 148 may specify a particular version of the AUT 102 for which information is to be acquired. Network characteristics may include an indication of particular networks, one or more types of networks, or one or more communication metrics associated with a network such as data throughput, latency, and so forth. For example, the analysis parameters 148 may specify a particular type of wireless network used by a computing device. Continuing the example, the analysis parameters 148 may specify that a device may transmit data when the device is able to communicate with a home network, but may refrain from transmitting data using other networks that may be associated with greater cost or less security. The analysis parameters 148 may also specify one or more types of test data 114 to be acquired by computing devices or one or more types of performance data 106 to be determined by the computing device(s). For example, the analysis parameters 148 may specify that the computing device(s) are to acquire device resource data 124 and are to refrain from acquiring user data 122.

The host device 108 may receive the analysis parameters 148 from the destination device 142 and determine that the characteristics of the user device 104 correspond to the characteristics specified in the analysis parameters 148. The host device 108 may provide an indication of the analysis parameters 148 to the user device 104. In response to the analysis parameters 148, the user device 104 may determine test data 114 and performance data 106 during use of the AUT 102, based on the analysis parameters 148. For example, based on the types of data specified in the analysis parameters 148, the user device 104 may determine certain types of data but refrain from determining other data. As another example, the analysis parameters 148 may cause the user device 104 to determine test data 114 and performance data 106 associated with particular functions of the AUT 102 while refraining from determining data associated with other functions.

Figure 2:
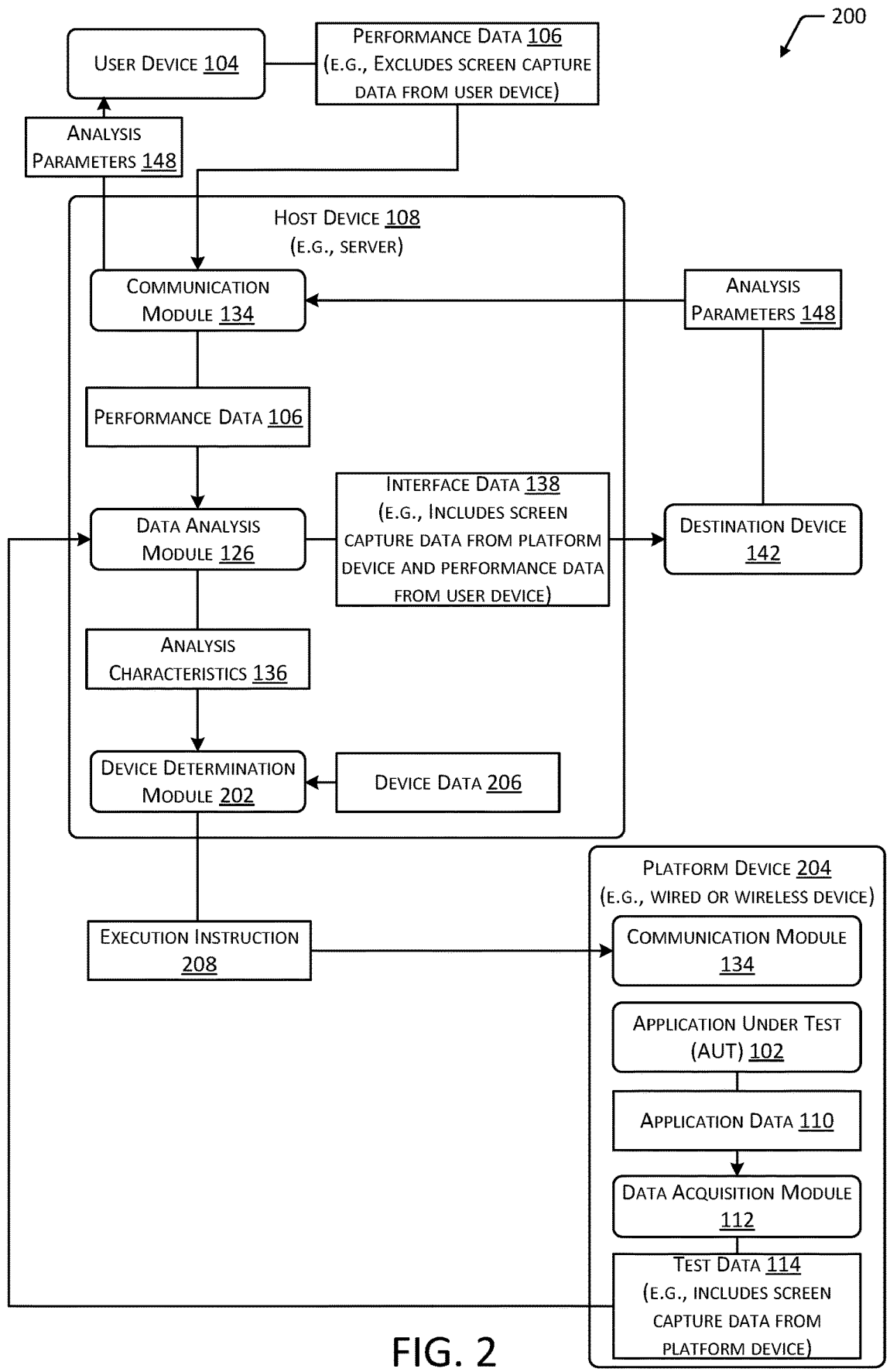
FIG. 2 is a diagram depicting an implementation of a system for determining test data from additional computing devices associated with an application under test (AUT) and generating interface data based on data received from a user device and the test data from the additional computing devices.

FIG. 2 is a diagram 200 depicting an implementation of a system for determining test data 114 from additional computing devices associated with an application under test (AUT) 102 and generating interface data 138 based on data received from a user device 104 and test data 114 from the additional computing devices. As described with regard to FIG. 1, a user device 104, such as a smartphone, a vehicle management system, or another type of computing device may execute an AUT 102, determine test data 114 based on the execution of the AUT 102, and may determine performance data 106 based on the test data 114. For example, test data 114 may include private information, such as screen capture data or other output data 116 indicative of content presented to a user, specific location data 120 indicative of a location of the user device 104, user data 122 or other information about one or more users, and so forth. The user device 104 may determine the performance data 106 locally (e.g., on the user device 104), without transmitting the test data 114 to another computing device, which may protect the privacy of users associated with the user device 104. The determined performance data 106 may include performance metrics indicative of functions of the AUT 102 or user device 104 during execution of the AUT 102, while excluding screen capture data, specific location data 120, and other types of private information. For example, the performance data 106 may include output metric values 128 while excluding specific output data 116, content characteristics 130 while excluding specific content data 118, general location data 132 while excluding specific location data 120, and so forth. In some implementations, the performance data 106 may be determined based in part on analysis parameters 148 provided by a destination device 142 or another computing device. For example, analysis parameters 148 may specify particular device characteristics, application characteristics, network characteristics, types of data to be acquired, and so forth. The user device 104 may determine the performance data 106 based on correspondence between characteristics of the user device 104 and the analysis parameters 148, and in some cases, the types of data acquired by the user device 104 may be determined based in part on the analysis parameters 148.

As described with regard to FIG. 1, a data analysis module 126 associated with the host device 108 may receive the performance data 106 from the user device 104 and determine analysis characteristics 136 and interface data 138 based on the performance data. The analysis characteristics 136 may include characteristics of the AUT 102, user device 104, or networks or other computing devices accessed by the user device 104. For example, based on the analysis characteristics 136, the host device 108 may determine one or more other computing devices that may execute the same AUT 102, that may be of the same or similar type of computing device as the user device 104, have similar components, access similar networks, and so forth. Continuing the example, by determining test data 114 that was acquired using another computing device under similar conditions as those associated with the user device 104, the host device 108 may determine additional test data 114 associated with the AUT 102. In some implementations, the host device 108 may cause one or more other computing devices to execute the AUT 102 and perform one or more functions associated with the AUT 102 in response to the determined analysis parameters 148. In other implementations, the host device 108 may determine existing test data 114 associated with one or more other computing devices that have executed the AUT 102.

For example, a device determination module 202 associated with the host device 108 may determine one or more other computing devices, such as a platform device 204, having one or more characteristics that correspond to the analysis characteristics 136 associated with the user device 104. In some implementations, the host device 108 may determine correspondence between the analysis characteristics 136 and device data 206, which associates characteristics of platform devices 204, or other computing devices, with characteristics of the computing devices, applications, networks, and so forth associated with the computing devices. Based on this correspondence, the host device 108 may determine one or more platform devices 204 that have previously executed the AUT 102 or may be caused to execute the AUT 102 to determine additional test data 114. In some implementations, the host device 108 may provide an execution instruction 208 to one or more platform devices 204 to cause the platform device(s) 204 to execute the AUT 102, perform particular functions associated with the AUT 102, and so forth. In other implementations, the host device 108 may acquire test data 114 stored in association with the platform device 204 or with the host device 108. For example, the execution instruction 208 may instead include a request indicating test data 114 associated with the AUT 102, responsive to which the platform device 204 may provide at least a portion of the test data 114 to the host device 108.

The platform device 204 may include any type of computing device including, without limitation, the types of computing devices described with regard to the user device 104, host device 108, or destination device 142. For example, the platform device 204 may include a device of the same or similar type as the user device 104 or having similar components to those of the user device 104. Continuing the example, the platform device 204 may include a smartphone or other type of computing device in wired or wireless communication with the host device 108. In some implementations, the host device 108 may itself execute the AUT 102 and determine additional test data 114, in addition to or in place of the platform device 204. Additionally, while FIG. 2 depicts a single platform device 204, in some implementations, multiple platform devices 204 may be caused to execute the AUT 102 to determine additional test data 114.

FIG. 2 depicts the platform device 204 determining application data 110 based on execution of the AUT 102. A data acquisition module 112 associated with the platform device 112 may then determine test data 114 based on the application data 110. The application data 110 and test data 114 may include the same or similar types of data as those described with regard to the test data 114 determined by the user device 104 in FIG. 1. For example, the test data 114 associated with the platform device 204 may include screen capture data or other types of output data 116, specific location data 120, and so forth. The host device 108 may receive the test data 114 from the platform device 204. While FIG. 2 depicts the platform device 204 determining the test data 114 based on the application data 110, in other implementations, the platform device 204 may send the application data 110 to the host device 108, which may determine the test data 114 based on the application data 110.

The interface data 138 determined by the host device 108 may be determined based in part on the test data 114 from the platform device 204, and in part on the performance data 106 from the user device 104. For example, the interface data 138 may include screen capture data associated with a platform device 204 and performance metrics associated with a user device 104. As a result, a user interface 140 presented by the destination device 142 may include screen capture data or other types of output data 116, even though output data 116 was not included in the performance data 106 received from the user device 104. The user interface 140 may include performance metrics associated with execution of the AUT 102 by the user device 104, which may represent realistic operations of the AUT 102 and user device 104, as actually operated by a user under real-world conditions. Therefore, interface data 138 generated using data from both the platform device 204 and the user device 104 may provide comprehensive information to a developer or other individual associated with the AUT 102, that includes screen capture data and other output data 116, as well as performance metrics associated with realistic use of the AUT 102, without compromising the privacy of a user associated with the user device 104.

Figure 3:
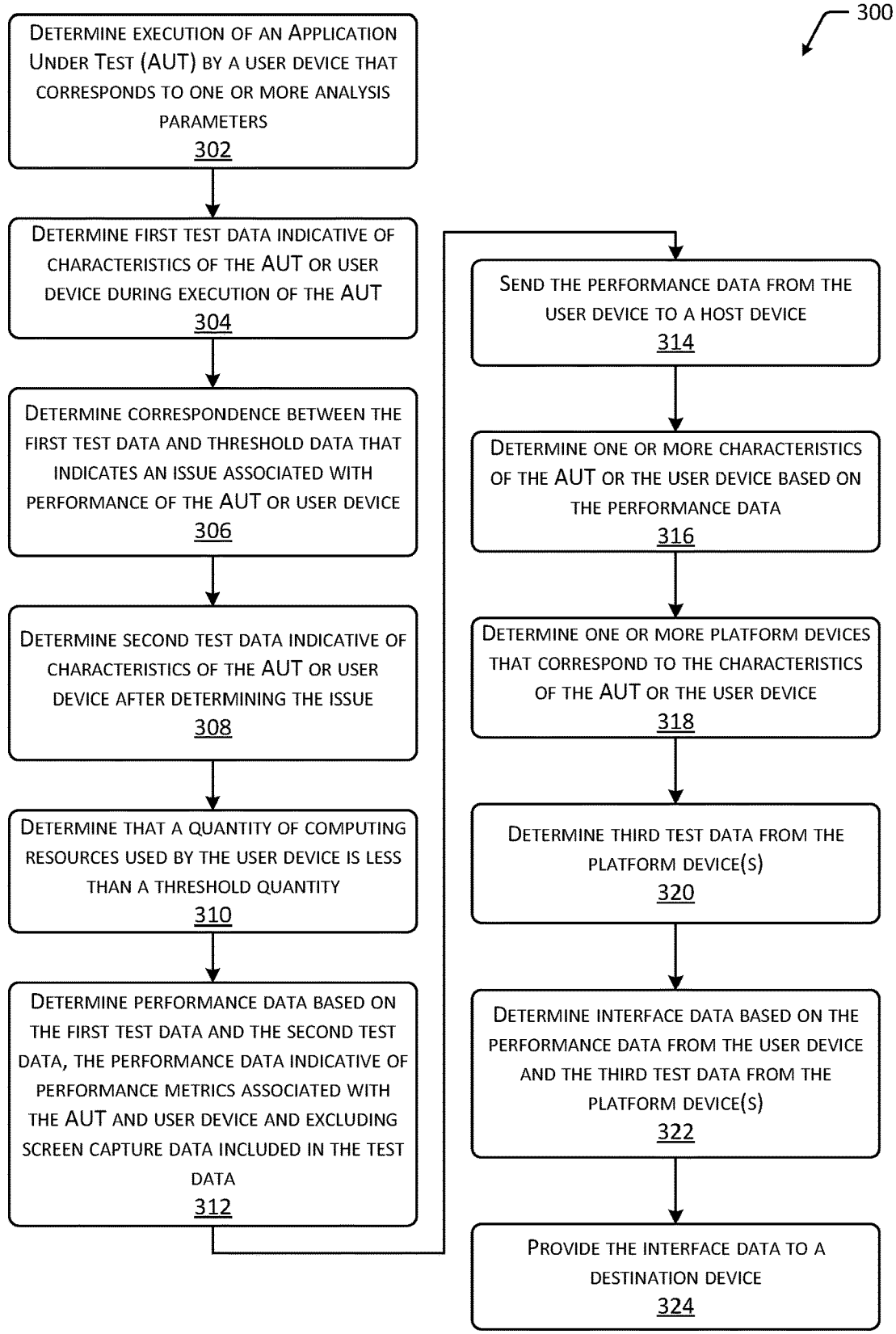
FIG. 3 is a flow diagram depicting an implementation of a method for determining data associated with an application under test (AUT) from multiple devices and determining interface data based on the data associated with the AUT.

FIG. 3 is a flow diagram 300 depicting an implementation of a method for determining data associated with an application under test (AUT) 102 from multiple devices and determining interface data 138 based on the data associated with the AUT 102. At 302, execution of an application under test (AUT) 102 by a user device 104 that corresponds to one or more analysis parameters 148 may be determined. For example, one or more analysis parameters 148 may specify a type of computing device, particular AUT 102, version of the AUT 102, characteristics of the computing device, types of data to be acquired, and so forth. One or more user devices 104 may be determined that correspond to the analysis parameters 148. A user in possession of such a user device 104, such as a smartphone, a vehicle-based computing device (such as an infotainment system), or another type of computing device may cause the computing device to execute the AUT 102. In some implementations, the AUT 102 may include computer-executable instructions for performing functions associated with the AUT 102, as well as computer-executable instructions for determining test data 114 associated with the AUT 102. For example, an SDK or other type of computer-executable instructions may be included within the AUT 102 and used to determine, log, or otherwise acquire or generate test data 114 associated with performance of functions by the AUT 102 and by the user device 104 during execution of the AUT 102. In other implementations, an SDK or other type of computer-executable instructions may be incorporated within system modules or the operating system of the user device 104 for acquiring data associated with performance of functions by the AUT 102 and by the user device 104 during execution of the AUT 102. As described with regard to FIGS. 1 and 2, the particular functions performed by the SDK or user device 104 and the particular data that is acquired may be determined based in part on analysis parameters 148 received from a destination device 142 or other computing device. For example, analysis parameters 148 may specify device characteristics, application characteristics, network characteristics, types of data to be acquired, and so forth, and the SDK may cause data specified in the analysis parameters 148 to be acquired if the conditions specified in the analysis parameters 148 are met.

At 304, first test data 114 indicative of characteristics of the AUT 102 or of the user device 104 during execution of the AUT 102 may be determined. As described with regard to FIGS. 1 and 2, a user device 104 may be configured to log, acquire, or otherwise determine test data 114 while the AUT 102 is used. The test data 114 may be retained in a buffer or stored in a data storage medium associated with the user device 104. In some implementations, the first test data 114 may include screen capture data or other output data 116 indicative of one or more outputs presented by the user device 104, specific location data 120, user data 122 or other information regarding one or more users, and so forth. To prevent compromising the private information of the user(s), the user device 104 may be configured to process or analyze the test data 114, such as determining performance data 106 based on the test data 114, without transmitting the test data 114 to other computing devices. For example, test data 114 that is retained in a buffer or other data storage medium but is not used to determine performance data 106 may be deleted. In some implementations, the particular types of test data 114 acquired by the user device 104, and the particular types of performance data 106 determined based on the test data 114, may be determined based in part on analysis parameters 148 received from a host device 108 or other computing device.

At 306, correspondence may be determined between the first test data 114 and threshold data that indicates an issue associated with performance of the AUT 102 or of the user device 104. For example, threshold data may indicate a threshold value associated with processor or memory utilization. If the device resource data 124 associated with the user device 104 indicates a processor or memory utilization that exceeds the threshold value, this may indicate an issue associated with execution of the AUT 102 by the user device 104. As another example, threshold data may include screenshots or characteristics of display outputs that may indicate an issue associated with an AUT 102, such as a blank screen that persists for at least a threshold length of time, a display output that includes an icon or animation indicative of loading or buffering of content that persists for at least a threshold length of time, display outputs that include characteristics indicative of blurriness, poor color saturation, or other characteristics indicative of low quality, and so forth. If a display output indicated in the output data 116 from the user device 104 corresponds to a threshold display output indicative of one or more characteristics associated with performance of the AUT 102 or user device 104, this may indicate an issue associated with the AUT 102. Other example indications of issues may include latency values, data throughput values, values associated with audio output, and so forth that differ from threshold values or fall outside of a threshold range. In some implementations, display outputs may be classified using one or more machine learning algorithms and data sets that include annotated display outputs. For example, if a display output presented by the user device 104 is similar to an annotated display output that represents a particular type of issue or a particular performance metric, such as a value indicative of video quality, the display output from the user device 104 may be associated with the same issue, performance metric, or value.

At 308, second test data 114 indicative of characteristics of the AUT 102 or of the user device 104 after determining the issue may be determined. For example, in response to determination of the correspondence between the first test data 114 and the threshold data, additional test data 114 may be acquired to determine characteristics associated with the issue. The second test data 114 may be stored in a buffer or other data storage medium associated with the user device 104.

At 310, a determination may be made that a quantity of computing resources used by the user device 104 is less than a threshold quantity. For example, if the user device 104 is currently in use, such as for performing functions associated with the AUT 102, analysis or processing of the test data 114, such as to determine performance data 106, may affect the performance of the AUT 102 or user device 104. Therefore, in some implementations, determination of performance data 106 may be delayed until it is determined that the computing resources used by the user device 104 are less than a threshold quantity. In some implementations, the quantity of computing resources used to determine the performance data 106, and in some cases to determine the test data 114, may be constrained to reduce the impact of the determination of performance data 106 or test data 114 on performance of the user device 104. For example, determination of performance data 106 may be performed using a single core or a subset of cores of the processor of the user device 104, a subset of the memory associated with the user device 104, and so forth.

At 312, performance data 106 may be determined based on the first test data 114 and the second test data 114. The performance data 106 may be indicative of performance metrics associated with the AUT 102 and with the user device 104 and may exclude screen capture data (or other private information) included in the test data 114. For example, performance data 106 may include output metric values 128, but may exclude screen capture data or other output data 116. As another example, performance data 106 may include general location data 132, but may exclude specific location data 120. As yet another example, performance data 106 may include device resource data 124 included in the test data 114 but exclude user data 122 included in the test data 114.

At 314, the performance data 106 may be sent from the user device 104 to a host device 108. As described previously, determination of the performance data 106 using the user device 104 may prevent the compromising of the privacy of one or more users associated with the user device 104 that may occur if the test data 114 were transmitted.

At 316, one or more characteristics of the AUT 102 or of the user device 104 may be determined based on the performance data 106. For example, as described with regard to FIG. 2, the host device 108 may determine analysis characteristics 136, such as a type or components associated with the user device 104, networks or other computing devices accessed by the user device 104, an identifier or other characteristics associated with the AUT 102, and so forth. In some implementations, analysis characteristics 136 may also include information included in the performance data 106, such as general location data 132 associated with the user device 104, content characteristics 130 associated with content presented based on the AUT 102, and so forth.

At 318, one or more platform devices 204 that correspond to the characteristics of the AUT 102 or of the user device 104 may be determined. As described with regard to FIG. 2, in some implementations, the host device 108 may determine correspondence between analysis characteristics 136 and device data 206, which associates characteristics of platform devices 204, or other computing devices, with characteristics of the computing devices, applications, networks, and so forth associated with the computing devices. Correspondence between the device data 206 and analysis characteristics 136 may indicate platform devices 204 of the same or similar type, or having the same or similar components, as the user device 104, or that access the same or similar networks or other computing devices. The determined platform devices 204 may therefore be associated with additional test data 114 that was determined under similar conditions as those associated with the user device 104.

At 320, third test data 114 may be determined from the platform device(s) 204. In some implementations, the host device 108 may access existing test data 114 stored in association with the host device 108 or the platform device(s) 204. In other implementations, the platform device(s) 204 may be caused to execute the AUT 102 and determine the third test data 114. For example, the host device 108 may provide an execution instruction 208 to one or more platform devices 204 to cause the platform device(s) 204 to execute the AUT 102, perform particular functions associated with the AUT 102, and so forth. The host device 108 may then receive test data 114 from the platform device(s) 204 or determine test data 114 based on other data received from the platform device(s) 204. In some implementations, platform devices 204 may not be associated with particular users for which private information may be a concern. For example, a platform device 204 may include a device in wired or wireless communication with the host device 108 that is able to be controlled at least in part using the host device 108 or by a user or administrator associated with the host device 108. In other implementations, platform devices 204 may be associated with users that have provided consent, authorization, or otherwise opted in for collection of private information. As such, the test data 114 determined from the platform device(s) 204 may include screen capture data, location data, or other private information not included in the performance data 106 received from the user device 104.

At 322, interface data 138 may be determined based on the performance data 106 from the user device 104 and the third test data 114 from the platform device(s) 204. At 324, the interface data 138 may be provided to a destination device 142, such as to cause presentation of a user interface 140. The user interface 140 may include performance metrics associated with execution of the AUT 102 by the user device 104, which may represent realistic operations of the AUT 102 and user device 104, as actually operated by a user under real-world conditions. The user interface 140 may also include screen capture data or other output data 116, and other information associated with the test data 114 received from the platform device(s) 204.

Figure 4:
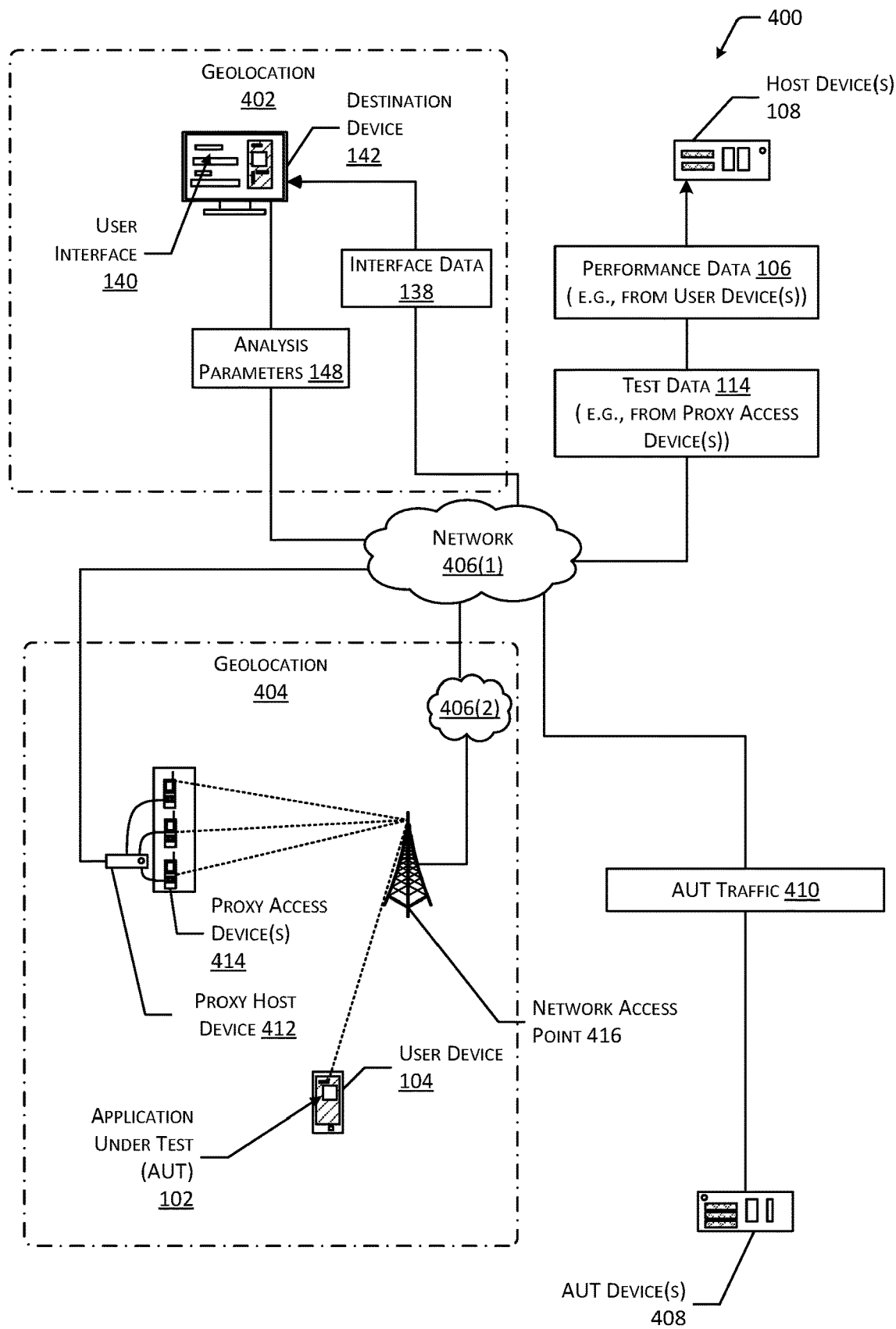
FIG. 4 is a diagram depicting an implementation of a system for testing an application under test (AUT) using devices at various locations.

FIG. 4 is a diagram 400 depicting an implementation of a system for testing an application under test (AUT) 102 using devices at various locations. An AUT 102 may be executed on one or more different types of computing devices, such as smartphones, laptop computers, tablet computers, wearable computing devices, embedded devices, desktop computers, computing devices associated with vehicles (such as infotainment systems, vehicle management systems, vehicle monitoring systems, vehicle control systems, and so forth), servers, computing devices associated with appliances or media devices, set top box devices, smart televisions, networked speaker devices, and so forth. When executing the AUT 102, a computing device may present an output, acquire an input, generate data, receive or process data, and so forth. The AUT 102 may include an application that is at any stage in a development or maintenance lifecycle. For example, the AUT 102 may include software that has not yet been released (e.g., an alpha, prerelease, or pre-launch version), or may include a previously released version that is undergoing testing. In some implementations, one or more computing devices that store or execute the AUT 102 may include an integrated development environment (IDE) to facilitate the creation and editing of program code, debugging, compiling, and so forth. In some implementations, one or more computing devices that store or execute the AUT 102 may include an emulator or simulator that is designed to execute the AUT 102 as though the AUT 102 were executing on another piece of hardware, using a different operating system, and so forth. For example, a destination device 142 may be associated with a developer of an AUT 102, and may be located at a first geolocation 402, which may be geographically separate from a second geolocation 404. The first geolocation 402 and second geolocation 404 may include any type of geographic location, such as a particular room, building, city, state, country, and so forth. For example, a geographic location may be specified by a set of coordinates with regard to latitude and longitude on the surface of the Earth. A user associated with the destination device 142 at the first geolocation 402 may intend to test the AUT 102 under conditions associated with the second geolocation 404. For example, the user of the destination device 142 may input analysis parameters 148 indicative of the second geolocation 404 or of particular conditions associated with use of the AUT 102, and one or more computing devices that correspond to the analysis parameters 148 may be determined.

Continuing the example, a user device 104 may be located in the second geolocation 404. The user device 104 may access one or more networks 406. For example, a first network 406(1) may comprise the Internet, or the first network 406(1) may be in communication with the Internet.

A second network 406(2) may include a WWAN, such as a wireless cellular data network (WCDN). The second network 406(2) may in turn communicate with the first network 406(1). For example, a WCDN operated by a telecommunication company may interconnect or have a peering agreement with an Internet backbone provider. As a result, a user of the second network 406(2) may be able to access resources on the first network 406(1), and vice versa. The connection used by the user device 104 may include, without limitation, a wired Ethernet connection, a wireless local area network (WLAN) connection such as Wi-Fi, a cellular connection, and so forth. During operation, the AUT 102 may access one or more external resources. For example, external resources may be stored in association with one or more AUT devices 408. The AUT device(s) 408 may include any number and any type of computing devices including, without limitation, the types of computing devices described with regard to the user device 104, host device 108, destination device 142, and platform device 204.

The AUT 102 may access, generate, transmit, or receive data. For example, the AUT 102 may cause AUT traffic 410 to be exchanged with one or more AUT devices 408 or other computing devices during operation. Traditionally, AUT traffic 410 associated with a test device at the first geolocation 402, such as the destination device 142 or another computing device in communication with the destination device 142, would be sent to the first network 406(1), and then to the AUT device(s) 408. However, this traditional situation may only enable test data 114 to be generated based on the conditions associated with the first geolocation 402 and first network 406(1). For example, execution of the AUT 102 using other devices, networks 406, and geolocations may cause generation of test data 114 indicative of different characteristics. However, this information may not be discoverable using test data 114 that is associated only with the first geolocation 402 and first network 406(1).

To enable the AUT 102 to be tested under conditions associated with different locations, such as the second geolocation 404, and different networks 406(2), a software development kit (SDK) may be incorporated into the AUT 102. In other implementations, techniques other than an SDK may be used to provide the functionality described herein. For example, lines of computer code that provide the functionality of at least a portion of the SDK may be incorporated into the code base of the AUT 102. In some implementations, the SDK may provide a user interface 140 that allows for the redirection of the AUT traffic 410. For example, the SDK may include instructions to establish communication with one or more host devices 108, such as servers or other computing devices, which may include modules for coordinating the activities of devices based on analysis parameters 148 and analyzing data determined from the devices. For example, the SDK may cause a user device 104 to determine test data 114 based on execution of an AUT 102 and determine performance data 106 based on the test data 114, then send at least a portion of the performance data 106 to a host device 108. Execution of the AUT 102 and performance of various functions may include the exchange of AUT traffic 410 with one or more AUT devices 408 via the first network 406(1), second network 406(2), or combinations thereof. The performance data 106 determined by the user device 104 may therefore be indicative of conditions associated with the second geolocation 404 and second network 406(2). For example, the performance data 106 may be indicative of video or audio quality or other characteristics of an output presented by a user device 104, data indicative of network conditions, data indicative of the particular functions performed by a user device 104 or components of the user device 104 that are used while executing the AUT 102, data relating to power or computational resources used by a user device 104 to perform various functions, and so forth. In some implementations, types of test data 114 or performance data 106 that are determined by the user device 104 may be controlled based at least in part on analysis parameters 148 indicated by the destination device 142. For example, a user associated with the destination device 142 may select particular types of data, and the host device 108 or another computing device may provide the analysis parameters 148 or an indication of the selected types of data to the user device 104.

In cases where data is sent to a host device 108, the host device 108 may coordinate the activities of one or more proxy host devices 412 or proxy access devices 414, which may function as platform devices 204. A proxy host device 412 may connect to the first network 406(1) and to one or more of the proxy access devices 414. In one implementation, the proxy host device 412 may include a server, desktop computer, tablet, or other type of computing device to which multiple proxy access devices 414 are connected using a wired connection, such as a cable connecting each proxy access device 414 to a USB port of the proxy host device 412. While FIG. 4 depicts a single proxy host device 412 and three proxy access devices 414, any number of proxy host devices 412 and proxy access devices 414 may be used. In some implementations, proxy host devices 412 and proxy access devices 414 may be placed in an enclosure at the second geolocation 404 to prevent unauthorized access to the devices or unauthorized transmission of content presented using the devices to individuals outside of the enclosure.

The proxy access devices 414 may connect to a network access point 416 that provides connectivity to the second network 406(2). While FIG. 4 depicts the proxy access devices 414 connecting to the same network access point 416 as the user device 104, in other implementations, the proxy access devices 414 may access the second network 406(2) using different access points, computing devices, or components. Use of the proxy access devices 414 to perform functions associated with an AUT 102 may enable data regarding performance of the functions to be determined when different types of devices are used, and using the second network 406(2). For example, the proxy access devices 414 may include commodity cellphones, the network access points 416 may include cell phone towers, and the second network 406(2) may include a WWAN, such as a wireless cellular data network (WCDN). The second network 406(2) may in turn communicate with the first network 406(1). In some implementations, the proxy access devices 414 may be capable of communication with the AUT device(s) 408 or other devices using the second network 406(2) or another network, such as a cellular network, without communicating using the first network 406(1). In some implementations, the proxy access devices 414 may be the same or a similar type of computing device as the user device 104, have the same or similar components, access the same or similar networks 406 or other computing devices, and so forth. For example, the host device 108 may cause proxy access devices 414 associated with a similar set of conditions as those associated with a user device 104 to execute the AUT 102 in order to determine additional test data 114 associated with use of the AUT 102 under the conditions associated with the user device 104. In other implementations, the host device 108 may determine existing test data 114 or performance data 106 associated with the proxy access devices 414 in addition to or in place of causing the proxy access devices 414 to execute the AUT 102.

The proxy access devices 414 may be located at the second geolocation 404, which may be geographically removed from the first geolocation 402 where the destination device 142 is located, but geographically proximate (e.g., within a threshold distance) of a location of the user device 104. For example, the proxy access devices 414 may be located in the same city, state, country, and so forth as the user device 104. As part of the testing process for the AUT 102, a user interface 140 may be presented to enable a user at the first geolocation 402 to specify analysis parameters 148, such as to select one or more of a particular geolocation, such as the second geolocation 404, or particular proxy access device 414 to use during testing. The host device(s) 108 may maintain information about the proxy access devices 414, such as device data 206. For example, the device data 206 may indicate a geolocation, availability, cost, characteristics of the proxy access device 414, and so forth. The host device(s) 108 may coordinate establishment of a connection between the AUT 102 and the proxy access device 414 that was selected. For example, establishment of a connection may be performed using the methods described in U.S. patent application Ser. No. 17/179,136, incorporated by reference previously.

In some implementations, during testing, the AUT traffic 410 may be routed through the first network 406(1) to the proxy host device 412, then through the proxy access device 414 to the second network 406(2), and then on to the first network 406(1) to ultimately arrive at the AUT device 408. The AUT traffic 410 may include outbound application traffic sent to the AUT device 408 and inbound application traffic sent from the AUT device 408 to devices executing the AUT 102. In some cases, at least a portion of the AUT traffic 410 may include test data 114 indicative of an output presented by a device, input received by the device, computational resources or components used by a device, characteristics of a network used by a device, and so forth.

During operation, the AUT 102 may direct outbound application traffic to the proxy host device 412, which may transfer the outbound application traffic to the proxy access device 414, which may then send the outbound application traffic to the second network 406(2). The second network 406(2) may send the outbound application traffic to the AUT device 408. Inbound application traffic from the AUT device 408 may follow the reverse path. The host device(s) 108, or one or more other devices, such as devices executing the SDK, may collect the test data 114 or other log data associated with operation of the system, such as information associated with operation of the proxy access device 414, packet capture of data transferred by the proxy host device 412, and so forth. For example, test data 114 associated with a proxy access device 414 may indicate, for a particular instant in time, one or more of: a current page on a website, type of network to which a proxy access device 414 is connected, quantity of data received, quantity of data transmitted, latency to the AUT device 408, data throughput, received signal strength, transmit power, cost associated with data transfer on the second network 406(2), and so forth. The data collected by the host device(s) 108 may therefore represent the AUT 102 operating on a real-world second network 406(2) at a desired geolocation, such as the second geolocation 404, under a set of conditions associated with a proxy access device 414. As described previously, test data 114 indicative of operation of the AUT 102 by one or more proxy access devices 414 may be used to generate a user interface 140 indicative of characteristics of input received by a device executing the AUT 102, output presented by such a device, computational resources used by the device, and so forth. For example, the destination device 142 may receive the test data 114, or interface data 138 representing at least a portion of the test data 114, and may present a user interface 140 based on at least a portion of the test data 114. Additionally, performance data 106 from one or more user devices 104 may be used to generate the user interface 140. For example, performance data 106 may indicate one or more performance metrics associated with use of the AUT 102 by the user device 104 but may exclude screen capture data or other private information associated with the user device 104.

Data determined by operation of user devices 104, proxy access devices 414, and so forth may be used to generate interfaces, reports, determine modifications to the AUT 102, and so forth. In some cases, a proxy host device 412 and proxy access device 414 at a particular geolocation may not be present or may not be usable to execute a particular AUT 102. In such a case, a user device 104 that wirelessly communicates with a host device 108 may enable execution of the AUT 102 at a desired geolocation to be tested. Additionally, in some cases, a device executing the AUT 102 may output or store proprietary information. In such a case, a device carried by an authorized user may be more secure than proxy devices stored at a location. In other cases, a device may be configured to preserve the privacy of the data. For example, an SDK that is incorporated within a device may be used to determine test data 114 and other data regarding execution of an AUT 102 while preventing access to data associated with the AUT 102 to users or other devices.

Figure 5:
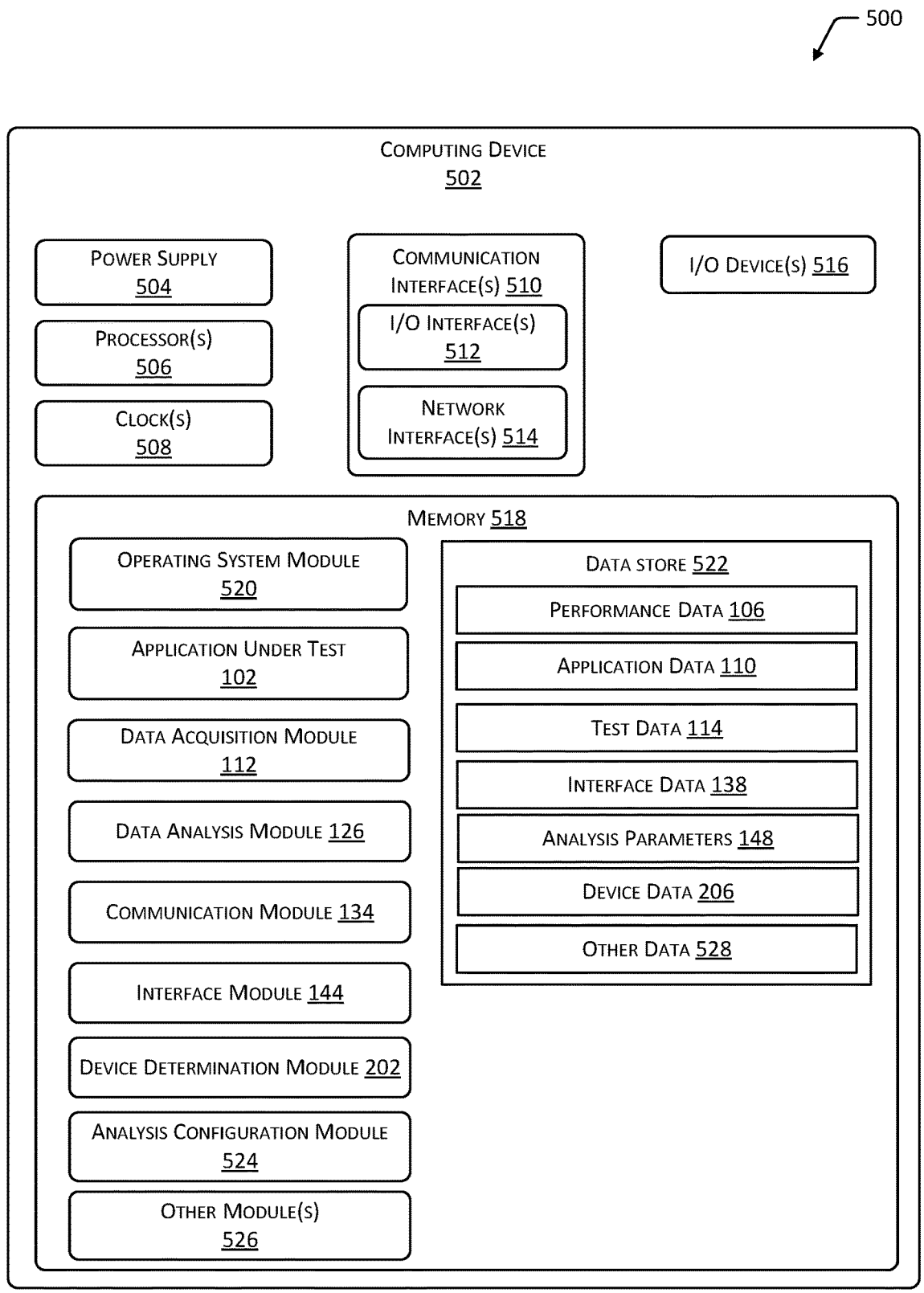
FIG. 5 is a block diagram depicting an implementation of a computing device within the present disclosure.

FIG. 5 is a block diagram 500 depicting an implementation of a computing device 502 within the present disclosure. The computing device 502 may include one or more edge devices (such as user devices 104), host devices 108, destination devices 142, platform devices 204, or other computing device(s) 502 in communication with a user device 104 or host device 108. For example, while FIGS. 1-4 describe example systems in which various functions are performed by user devices 104, host devices 108, destination devices 142, and platform devices 204, other combinations of computing devices 502 may perform the functions that are described. Continuing the example, a single computing device may perform each of the described functions, or multiple computing devices may each perform one or more functions. As such, while FIG. 5 depicts a single block diagram 500 of an example computing device 502, any number and any type of computing devices 502 may be used to perform the functions described herein. For example, a portion of the functions described herein may be performed by one or more host devices 108, while other functions may be performed by one or more user devices 104 or platform devices 204.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC). In some implementations, the functionality described with regard to one or more of the modules may be incorporated within a software development kit (SDK), may be performed using one or more Application Programming Interfaces (APIs), and so forth.

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

The memory 518 may also include the communication module 134, which may be configured to establish communications with one or more other computing devices 502. Communications may be authenticated, encrypted, and so forth. In some implementations, communication may be established between computing devices 502 by determining sets of communication parameters, such as protocols, types or formats of data, networks 406, and routes for transmission of data that may be used by two computing devices 502 when sending or receiving data. For example, one implementation by which computing devices 502 may establish communication is described in U.S. patent application Ser. No. 17/179,136, incorporated by reference previously.

The memory 518 may also store one or more applications under test 102 (AUT). An AUT 102 may include code or other types of computer-executable instructions that may cause a device to perform one or more functions. In some implementations, the functions may be associated with one or more I/O devices 516, such as acquiring data using a camera or microphone, or presenting output using a display or speaker. Functions may also include generation, processing, or presentation of data. Characteristics of the data associated with a computing device 502 executing the AUT 102 may be used to determine performance of the AUT 102 or of the computing device 502 under various conditions. For example, a particular function of the AUT 102 may be recorded over time, and the network conditions, device conditions, and other factors that may affect performance of the AUT 102 at particular times may also be determined. An interface or another type of output may be presented that associates performance of the AUT 102 with times at which the performance occurred and other characteristics of the AUT 102, device, network 406, and so forth.

In some implementations, the AUT 102 may be associated with control or monitoring of one or more systems of a vehicle or a vehicle-based infotainment system. For example, an AUT 102, or a data acquisition module 112 that acquires data associated with the AUT 102, may control or determine information related to the locked or unlocked status of a vehicle door or trunk, an alarm or threat detection system, the presence or absence of passengers, the activated or deactivated state of the engine, horn, or one or more lights, or the location of a vehicle. As another example, an AUT 102 or data acquisition module 112 may determine information related to a vehicle owner's manual or other documents or videos, determine, schedule, or locate service for the vehicle, and so forth. As yet another example, an AUT 102 or data acquisition module 112 may determine a status of a vehicle fuel tank, tire pressure, oil or filter status, odometer status, vehicle identifiers, information related to vehicle dealerships or recalls, and so forth. As another example, an AUT 102 or data acquisition module 112 may determine information relating to settings or preferences of a vehicle owner with regard to a vehicle-based computing device 502, driving statistics or habits, and so forth. An AUT 102 or data acquisition module 112 may also determine information relating to trailers, such as trailer lights, loads, vehicle weight management functions, trailer hitch functions, and so forth. In some cases, an AUT 102 or data acquisition module 112 may determine information relating to charging of vehicles that use electrical power.

The memory 518 may store the data acquisition module 112. The data acquisition module 112 may determine test data 114 based on application data 110 associated with the AUT 102. In some implementations, the data acquisition module 112 may include an SDK or other type of code included within the AUT 102 or within one or more system modules, such as the OS module 520. In some cases, the data acquisition module 112 may include one or more logging modules, telemetry modules, data processing modules, and so forth, that may store one or more portions of the application data 110, modify one or more portions of the application data 110, generate additional data based on one or more portions of the application data 110, and so forth. As described with regard to FIGS. 1-4, in some implementations, the specific types of test data 114 that are determined and the specific conditions under which test data 114 is determined may be controlled based at least in part on analysis parameters 148.

The memory 518 may also store the data analysis module 126. The data analysis module 126 may determine performance data 106 based at least in part on test data 114 acquired during execution of an AUT 102. The performance data 106 may include data indicative of performance of the AUT 102 or a computing device 502 executing the AUT 102 while excluding private information associated with one or more users, such as screen capture data, specific location data 120, and so forth. For example, the performance data 106 may be determined by determining output metric values 128 indicative of characteristics of a presented output, a general location based on specific location data 120, characteristics of presented content and values associated with the characteristics, device resource data 124 indicative of computational resources used by the computing device 502 during execution of the AUT 102, and so forth. The data analysis module 126 may also determine interface data 138 and analysis characteristics 136 based on performance data 106 received from other computing devices 502. For example, analysis characteristics 136 may indicate characteristics of an AUT 102 or computing device 502 associated with the received performance data 106. Interface data 138 may include data configured to cause presentation of a user interface 140 indicative of at least a portion of the performance data 106.

The memory 518 may additionally store the interface module 144. The interface module 144 may cause presentation of a user interface 140 based on the interface data 138 determined by the computing device 502 or received from another computing device 502. The user interface 140 may include information indicative of one or more performance metrics represented by performance data 106. In some cases, the user interface 140 may also include information determined from test data 114 received from one or more other computing devices 502 executing the AUT 102.

The memory 518 may store the device determination module 202. The device determination module 202 may determine computing devices 502 having one or more characteristics that correspond to the analysis characteristics 136 determined based on performance data 106 received from one or more other computing devices 502. In some implementations, correspondence between the analysis characteristics 136 and device data 206, which indicates characteristics of computing devices 502, may be used to determine corresponding computing devices 502. Based on this correspondence, additional test data 114 determined using computing devices 502 having similar characteristics may be accessed. In some implementations, computing devices 502 having similar characteristics may be caused to execute the AUT 102 to determine additional test data 114.

The memory 518 may also store an analysis configuration module 524. The analysis configuration module 524 may receive analysis characteristics 148, such as by presenting an interface and receiving user input indicative of the analysis characteristics 148 via the interface. The analysis configuration module 524 may provide data indicative of the analysis characteristics 148 to one or more other computing devices 502, such as to cause the computing devices 502 to acquire particular types of data based on the analysis characteristics 148.

Other modules 526 may also be present in the memory 518. For example, other modules 526 may include user interface modules for processing interactions with user interfaces 140. Other modules 526 may include modules for modifying portions of the AUT 102 based on determined issues. Other modules 526 may include authorization modules for receiving authorization from users regarding collection of application data 110, test data 114, or performance data 106. Other modules 526 may include modules for determining threshold values indicative of issues associated with performance of the AUT 102, modifying threshold values based on user input, and so forth. Other modules 526 may further include encryption modules to encrypt and decrypt communications between computing devices 502, authentication modules to authenticate communications sent or received by computing devices 502, a permission module to assign, determine, and manage user permissions to access or modify data associated with computing devices 502, and so forth.

Other data 528 within the data store(s) 522 may include configurations, settings, preferences, and default values associated with computing devices 502. Other data 528 may also include encryption keys and schema, access credentials, threshold data, and so forth. For example, other data 528 may include threshold values for computational resources, threshold display outputs indicative of characteristics of application performance, and so forth. Other data 528 may additionally include rules or criteria for determining when to cause devices to perform functions, such as execution of an AUT 102 or performance of other functions, transmission of data, and so forth.

In different implementations, different computing devices 502 may have different capabilities or capacities. For example, host devices 108, such as servers, may have greater processing capabilities or data storage capacity than user devices 104, such as smartphones.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a first computing device comprising:
      a wireless communication interface;
      an application including first computer-executable instructions and second computer-executable instructions, wherein the second computer-executable instructions are associated with one or more functions of the application, and wherein the first computing device executes the second computer-executable instructions to generate test data; and
      one or more first hardware processors to execute the first computer-executable instructions to:
         determine execution of the second computer-executable instructions by the first computing device;
         determine first data based on the test data, wherein the first data is indicative of one or more of: an output associated with the application that is presented by the first computing device or an input associated with the application that is received by the first computing device, and wherein the first data is associated with a first time period;
         determine, based on the first data, at least one performance metric associated with one or more of: the first computing device, the application, one or more networks in communication with the first computing device, or one or more computing devices in communication with the first computing device, wherein the at least one performance metric is based on a characteristic of the one or more of the output or the input;
         determine that the at least one performance metric differs from a threshold value;
         in response to the at least one performance metric differing from the threshold value, determine second data associated with a second time period before the first time period, wherein the second data is indicative of at least one characteristic of the one or more of the first computing device, the application, the one or more networks, or the one or more computing devices in communication with the first computing device;
         generate third data based at least in part on the second data, wherein the third data is indicative of the at least one characteristic and the at least one performance metric, and wherein the third data excludes data indicative of the one or more of the output or the input; and
         provide, using the wireless communication interface, at least a portion of the third data to a second computing device.

2. The system of claim 1, further comprising first computer-executable instructions to:
   determine that the at least one performance metric is outside of a threshold range;
   wherein the at least a portion of the third data is provided to the second computing device in response to the at least one performance metric being outside of the threshold range.

3. The system of claim 1, wherein the first data includes screen capture data, the system further comprising first computer-executable instructions to:
   determine correspondence between at least a portion of the screen capture data and a threshold display output that is indicative of a characteristic of application performance;
   wherein in response to the correspondence, one or more of: the first data is determined, the second data is determined, the third data is generated, or the at least a portion of the third data is provided to the second computing device.

4. The system of claim 1, further comprising first computer-executable instructions to:
   determine that a quantity of computational resources used by the first computing device during execution of the application is less than a threshold quantity;

wherein in response to the quantity of computational resources being less than the threshold quantity, one or more of: the first data is determined, the second data is determined, the third data is generated, or the at least a portion of the third data is provided to the second computing device.

5. The system of claim 1, further comprising:
one or more second hardware processors associated with the second computing device to execute third computer-executable instructions to:
   receive a request comprising an analysis parameter indicative of one or more of:
a characteristic of the application, a characteristic of the first computing device, or a characteristic of a network associated with the first computing device;
   determine that one or more characteristics associated with the first computing device correspond to the analysis parameter;
   in response to the one or more characteristics associated with the first computing device corresponding to the analysis parameter, cause the first computing device to determine one or more of the first data, the second data, or the third data;
   receive the at least a portion of the third data from the first computing device; and
   provide, to a third computing device, one or more of: the at least a portion of the third data, or fourth data determined based on the at least a portion of the third data, wherein the one or more of the at least a portion of the third data or the fourth data causes the third computing device to present an interface indicative of the at least one performance metric.

6. The system of claim 1, further comprising:
one or more second hardware processors associated with the second computing device to execute third computer-executable instructions to:
   determine one or more first characteristics of the one or more of the first computing device, the application, the one or more networks, or the one or more computing devices in communication with the first computing device;
   determine a third computing device having one or more second characteristics that correspond to the one or more first characteristics;
   based on the one or more second characteristics corresponding to the one or more first characteristics, determine fourth data associated with execution of the application by the third computing device, wherein at least a portion of the fourth data includes data indicative of one or more of an output or an input associated with the third computing device; and
   determine fifth data based on the at least a portion of the third data and the at least a portion of the fourth data, wherein the fifth data causes one or more computing devices to present an interface indicative of the at least one performance metric and the one or more of the output or the input associated with the third computing device.

7. A system comprising:
one or more first hardware processors to execute first computer-executable instructions to:
   determine first data associated with execution of an application at a first time, wherein a first portion of the first data includes one or more of: data indicative of an output associated with the execution of the application, data indicative of an input associated with the execution of the application, or location data associated with the execution of the application;
   determine second data based at least in part on the first portion of the first data, wherein the second data is indicative of at least one performance metric associated with the one or more of the data indicative of the output associated with the execution of the application, the data indicative of the input associated with the execution of the application, or the location data associated with the execution of the application, and wherein the second data excludes the first portion of the first data;
   determine that one or more of at least a portion of the first data or at least a portion of the second data differs from a threshold value;
   in response to the one or more of the at least a portion of the first data or the at least a portion of the second data differing from the threshold value, determine third data associated with execution of the application at a second time before the first time;
   determine fourth data based at least in part on the third data; and
   provide at least a portion of the fourth data to one or more of a data storage medium or a first computing device, wherein the fourth data is indicative of an interface that includes the at least one performance metric and excludes the one or more of the data indicative of the output, the data indicative of the input, or the location data.

8. The system of claim 7, wherein in response to the one or more of the at least a portion of the first data or the at least a portion of the second data differing from the threshold value, one or more of: the at least a portion of the fourth data is determined, or the at least a portion of the fourth data is provided to the one or more of the data storage medium or the first computing device.

9. The system of claim 7, wherein the one or more first hardware processors are associated with a vehicle, and one or more of the first data, the second data, the third data, or the fourth data is indicative of at least one operation of the vehicle.

10. The system of claim 7, wherein the first computer-executable instructions are included within the application, and wherein execution of the application causes execution of at least a portion of the first computer-executable instructions.

11. The system of claim 7, further comprising:
one or more second hardware processors associated with the first computing device to execute second computer-executable instructions to:
   receive the at least a portion of the fourth data from a second computing device;
   determine at least one first characteristic associated with the second computing device;
   determine that at least one second characteristic associated with a third computing device corresponds to the at least one first characteristic;
   based on the at least one second characteristic corresponding to the at least one first characteristic, determine fifth data associated with execution of the application by the third computing device, wherein the fifth data includes test data indicative of one or more of:
      data indicative of an output associated with the execution of the application by the third computing device;

data indicative of an input associated with the execution of the application by the third computing device; or location data associated with the execution of the application by the third computing device; and provide at least a portion of the fifth data to the one or more of the data storage medium or the first computing device, wherein the interface is further generated to include at least a portion of the test data.

12. The system of claim 11, further comprising second computer-executable instructions to:

determine at least one third characteristic associated with the application based on the at least a portion of the fourth data; and determine that the fifth data corresponds to the at least one third characteristic, wherein the at least a portion of the fifth data is provided based at least in part on the fifth data corresponding to the at least one third characteristic.

13. A system comprising:

one or more first hardware processors associated with a first computing device to execute first computer-executable instructions to:

determine first data associated with execution of an application, wherein a first portion of the first data includes one or more of: data indicative of an output associated with the execution of the application, data indicative of an input associated with the execution of the application, or location data associated with the execution of the application;

determine second data based at least in part on the first portion of the first data, wherein the second data is indicative of at least one performance metric associated with the one or more of the data indicative of the output associated with the execution of the application, the data indicative of the input associated with the execution of the application, or the location data associated with the execution of the application, and wherein the second data excludes the first portion of the first data; and provide at least a portion of the second data to one or more of a data storage medium or a second computing device, wherein the second data is indicative of an interface that includes the at least one performance metric and excludes the one or more of the data indicative of the output, the data indicative of the input, or the location data; and one or more second hardware processors associated with the second computing device to execute second computer-executable instructions to:

receive the at least a portion of the second data;

determine at least one first characteristic based on at least a portion of the second data;

determine at least one second characteristic associated with the application based on the at least a portion of the second data;

determine that at least one third characteristic associated with a third computing device corresponds to the at least one first characteristic and the at least one second characteristic;

based on the at least one third characteristic corresponding to the at least one first characteristic and the at least one second characteristic, determine third data associated with execution of the application by the third computing device, wherein the third data includes test data indicative of one or more of:

data indicative of an output associated with the execution of the application by the third computing device;

data indicative of an input associated with the execution of the application by the third computing device; or location data associated with the execution of the application by the third computing device; and provide at least a portion of the third data to the one or more of the data storage medium or the second computing device, wherein the interface is further generated to include at least a portion of the test data.

14. The system of claim 13, further comprising second computer-executable instructions to:

determine one or more components associated with the first computing device; and determine that the third computing device includes at least a subset of the one or more components that are associated with the first computing device.

15. The system of claim 13, further comprising second computer-executable instructions to:

determine one or more first networks accessed by the first computing device; and determine that at least a subset of one or more second networks accessed by the third computing device are included in the one or more first networks accessed by the first computing device.

16. The system of claim 13, further comprising second computer-executable instructions to:

determine a first location associated with the first computing device;

determine a second location associated with the third computing device; and determine that the first location is within a threshold distance of the second location.

17. The system of claim 13, further comprising second computer-executable instructions to:

receive a request comprising an analysis parameter indicative of one or more of: a characteristic of the application, a characteristic of the first computing device, or a characteristic of a network associated with the first computing device;

determine that one or more characteristics associated with the first computing device correspond to the analysis parameter; and in response to the one or more characteristics associated with the first computing device corresponding to the analysis parameter, cause the first computing device to determine the first data;

wherein the at least a portion of the third data causes the first computing device to present the interface.

18. The system of claim 13, wherein the first data is associated with a first time, the system further comprising first computer-executable instructions to:

determine that one or more of at least a portion of the first data or at least a portion of the second data differs from a threshold value; and in response to the one or more of the at least a portion of the first data or the at least a portion of the second data differing from the threshold value, determine fourth data associated with execution of the application at a second time before the first time;

wherein the second data is further determined based in part on the fourth data.

19. The system of claim 13, wherein the first data is associated with a first time period, the system further comprising first computer-executable instructions to:

determine that the at least one performance metric differs from a threshold value; and in response to the at least one performance metric differing from the threshold value, determine fourth data associated with a second time period that is before the first time period, wherein the second data is indicative of at least one characteristic of the one or more of the data indicative of the output associated with the execution of the application, the data indicative of the input associated with the execution of the application, or the location data associated with the execution of the application;

wherein the second data is further determined based in part on the fourth data.

20. The system of claim 13, wherein the at least one first characteristic is associated with one or more of: the first computing device, the application, one or more networks in communication with the first computing device, or one or more computing devices in communication with the first computing device.

* * * * *